Patented Mar. 13, 1928.

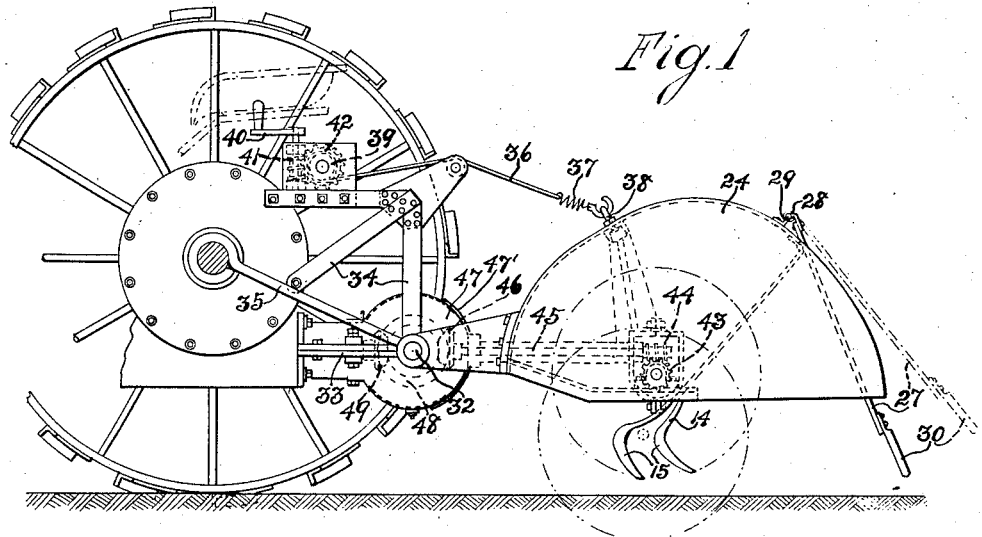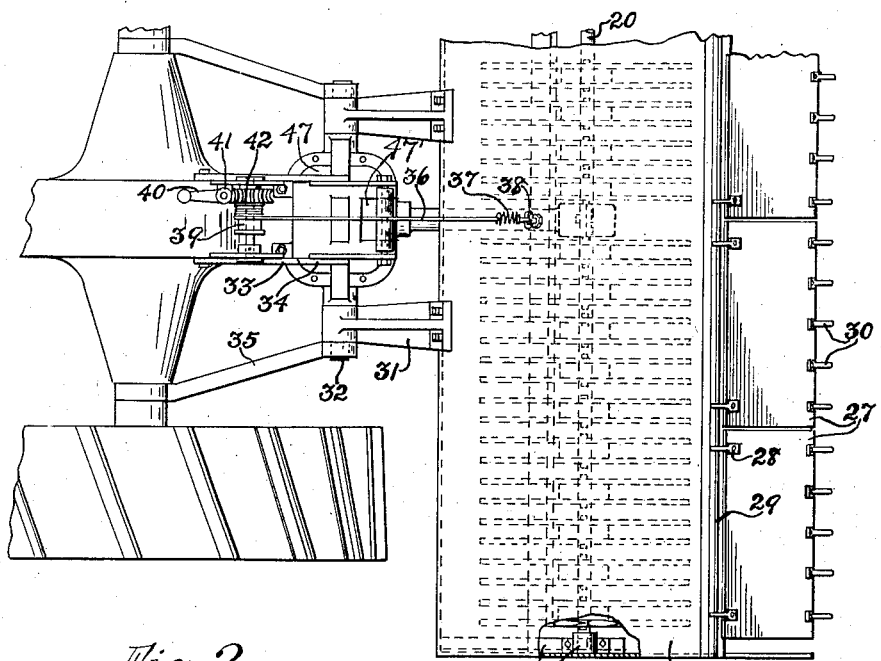

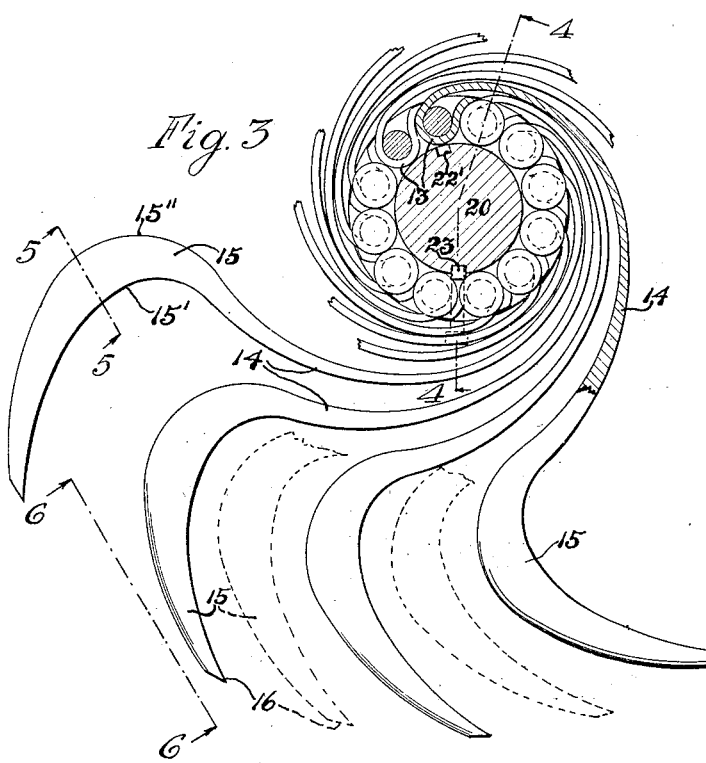
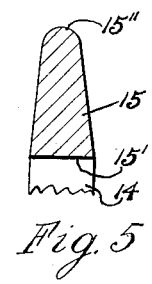
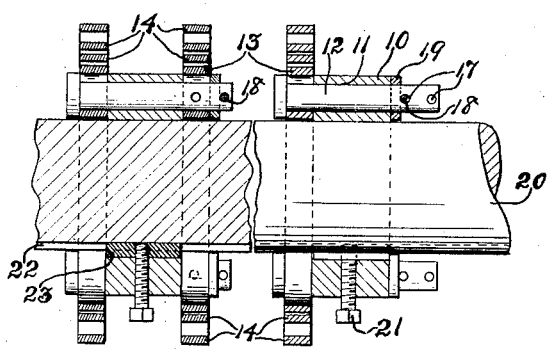
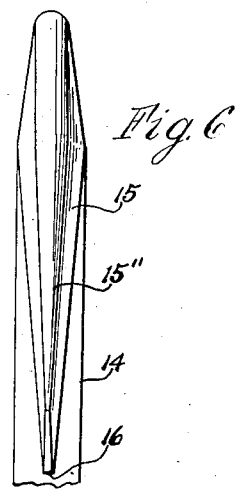

1,662,088

UNITED STATES PATENT OFFICE.

HANS VON RAUSSENDORFF, OF CHICAGO, ILLINOIS.

TILLER.

Application filed October 25, 1926. Serial No. 143,826.

My invention pertains to a tiller, and more particularly to a rotary one; and one of the chief objects of the invention is to provide such a tiller having tools with claws which are mounted resiliently and arranged to hack and till the soil, and each tool with its claw being independently yieldable in any direction, to free itself from an obstacle.

Another object is to arrange the tools with the claws placed around a central axis to form a cylinder, and the claws being supported on spring shanks which are curved and overlie each other, so that, when a claw encounters an obstacle of considerable resistance, the shank will press back on the following one and then crowd together the succeeding ones which thus reinforce one another.

Another object is to arrange a number of tools in the form of a circular wreath, and so mounted that either one plane of tools or several planes of tools may be used on a wreath at any time, as desired.

A further object is to arrange the tools in the form of a number of circular wreaths, and to mount a plurality of wreaths in axial alinement, and so that they may be spaced apart so as to suit any desired tillage and any condition of soil.

Another object is to provide frame mechanism with means for supporting the wreaths of tools in an operative and in an inoperative position, and including driving means to rotate the same so as to move the tools through the ground in a rearward direction.

A still further object is to provide a frame with housing means to prevent undesired spreading of earth particles, and to protect the tools, and also including rearwardly swinging end gate means to prevent clogging of earth in the housing.

Other objects and advantages are attained with my invention, as will become apparent from the following description taken in connection with the accompanying drawings, in which, Fig. 1 is a side view of a certain form of my new and improved tiller mounted in position on the rear of a motor tractor, to be driven thereby;

Fig. 2 is a partial plan view thereof;

Fig. 3 is an enlarged side view, partly broken away, of a wreath of tools, mounted in position on a central drive shaft;

Fig. 4 is a sectional view on line 4—4 of Fig. 3, indicating the use of either one or more sets or planes of tools on a wreath;

Fig. 5 is an enlarged sectional view of the claw of a tool, taken on line 5—5 of Fig. 3; and Fig. 6 is an enlarged view on line 6—6 of Fig. 3, showing a claw from the rear.

In the drawings I have shown a certain form of my invention, particularly adapted for use with a motor tractor, and comprising a rotatable cultivator or tiller having tools with claws arranged around a central axis to form a cylinder, and means for housing and for supporting the tiller in various positions, including frame and bracket means and hand operated means for moving and retaining the tiller and its housing means in such positions; also gear means for driving the tiller by the driving means of the tractor.

The rotatable tiller mechanism comprises a plurality of wreaths of tools, the wreaths being mounted side by side or in axial alinement, with the outer ends of the tools forming a cylinder, and each wreath preferably includes a ring 10 having a number of bores 11 formed axially therethrough to receive pins 12, and each tool has an eye portion 13 at the inner end placed at a side of a ring and embracing an end of a pin. Each tool further includes a curved resilient shank 14 having a claw 15 at the outer end, said claw being curved in a direction reverse to the curvature of the shank. A plurality of the tools are placed at a side of a ring and arranged in succession and spaced apart to form a circular plane or set of tools, the end of each shank being curved over to form the eye portion embracing the pin, and the extreme or free end of the metal which forms the eye portion presses against the eye portion of the succeeding tool, so that the tools locate themselves elastically and can turn both ways on the pins; and the construction and placing of the tools with their shanks is such that when one claw encounters an obstacle of considerable resistance, the shanks, due to their resilience and curvature, will move back and brace and reinforce one another. The shanks are furthermore narrow and resilient laterally and are also adapted to twist or flex so that a claw can move sideways as well as forward or backward and upward to move free from an obstacle, that is, a claw can move independently in any direction. The claws are shaped broad and flat on the face side 15' and are narrowed down toward the rear edge 15", as indicated in Fig. 5, and are also beveled or wedge shaped toward the outer end 16 to form a sharp point, as indicated in the drawings.

I arrange the wreaths for the use of either one plane or more planes of tools, and I preferably do this by using pins 12 which have two holes 17 provided therethrough, in either of which I place a cotter pin 18, or the like, and also use a washer 19; thus one plane of tools may be omitted, as indicated at the right hand side of Fig. 4, or all the planes of tools may be used, as indicated at the left hand side of Fig. 4; thereby adapting the tiller for various forms or conditions of tillage desired, and also to the power available for operating the tiller.

A plurality of wreaths are placed side by side, or in axial alinement, and are preferably mounted on a shaft 20, as with set screws 21, so as to be spaced apart axially thereon, at any distance suitable. The shaft is preferably also provided with keyways 22 and 22' to receive keys or ribs 23 formed on the rings, in order to assure rotation of the rings and tools with the shaft. As there are preferably twelve tools with their claws used in a set or plane of tools, and the tools being placed 30° apart, these two keyways are located 165° apart, or 15° less than a half circle, and the successive wreaths of tools are mounted alternately with their keys 23 in these two keyways 22 and 22', whereby the tools on the alternate wreaths are positioned 15° apart or staggered, as indicated by the full lines and the dot and dash lines therebetween in Fig. 3.

A housing 24 is provided over the wreaths of tools, to protect the same and to prevent undesired spreading of earth particles. The tools are rotatably mounted in the housing by journaling the ends of shaft 20 in bearing members 25 on frame bars 26 at the sides of the housing. Gate means 27, preferably in the form of several sections, are swingably mounted at the rear of the housing, by eyes 28 and rod means 29, and fingers 30 are provided at the bottom of said gate means and arranged to move over the ground during operation of the tiller. As each gate section swings separately and freely, the clogging of earth particles and any matter in the housing, at any point, is fully and conveniently avoided.

The housing and rotatable tiller therein are swingably mounted on the tractor, as by means of frame arms 31 extending forward from the housing and journaled on a pivot shaft 32 provided on bracket means 33, which includes intermediate bars 34 fastened to the tractor and bracing side arms 35 extending outwardly, to the tractor axle.

The means for raising and lowering the tiller with the housing on pivot shaft 32 and for holding the same in position preferably includes a cable 36, with a resilient member 37 mounted therein, and attached to an eye 38 on the housing, said cable being windable on a drum 39, which is actuated manually by a crank 40 with a worm 41 thereon driving a worm gear 42 fastened on the drum. The tiller with its claws may thus be moved and held in any suitable position with the claws located either in or above the ground.

Gear means for driving the tiller by means of the tractor preferably includes a worm gear 43 fastened on an intermediate part of the tiller shaft 20, and driven by a worm 44 on a shaft 45 extending forwardly and having a bevel pinion 46 at its front end, which engages a vertical bevel gear 48 and is swingable with the tiller vertically thereon, said gear being driven by a bevel pinion 49 actuated by the driving mechanism of the tractor. A casing 47 is mounted over these pinions and gear to keep them dust proof, and has a part cut out at the rear, which is made dust proof by a curved gate 47' slidable over said cut-out portion, and swingable with shaft 45 and the tiller.

The claws and the shanks are curved in the reverse direction and are so constructed and arranged that, as the tiller moves forward, each claw descends into the ground and cuts the soil in a substantially vertical line, and then with the broad face 15', near the inner part of the claw, or the part where the claw merges with the shank, it wedges and pushes the soil over rearwardly, and thereafter the claws lift and throw the soil particles and spread and scatter the same, during their upward movement from the ground, thereby producing an excellent crumb structure, thoroughly aired, and with all earth particles and all added organic matter completely mixed and intermingled.

What I claim as my invention and desire to secure by Letters Patent is:

1. A tiller comprising a rotatable wreath including a ring having a plurality of tools with resilient curved shanks mounted on said ring and being arranged in succession and spaced so the shanks will engage and brace each other when a tool encounters a fixed obstacle.

2. A tiller comprising a plurality of rotatable wreaths including a ring and resilient tools removably mounted thereon in central circular planes, the construction being arranged so that either several of the planes of tools may be used on a ring or only one plane of tools and another plane be omitted, during operation.

3. A tiller comprising a shaft, a ring adjustably mounted thereon and having a plurality of bores, a plurality of tools with shanks arranged in circular planes on the sides of said ring, and means including pins in said bores for mounting either a plane of tools on each side of said ring or for using one plane on one side of the ring and omitting the other plane.

4. A tiller comprising a rotatable shaft or axle, wreaths mounted on said shaft and including a ring and a plurality of tools arranged and fixed on and around said ring in planes, a plurality of said tool wreaths being spaced adjustably on said shaft, said tools having flexible curved shanks and being arranged in radial succession in each plane and spaced so that the shanks will brace and reinforce each other when a tool encounters an obstacle, so as to pull it out or to elude it by moving to either side independently from each other.

5. A tiller comprising rotatable wreaths of tools, a pin for mounting each tool, each tool having a spring steel shank with its end curved over to form an eye portion which fits around a pin, the extreme end of the metal of said eye portion is pressed against the eye portion of the succeeding tool while the shank part of said eye portion is pressed against the end of the metal forming the eye portion of the preceding tool, so that the tools locate themselves elastically and allow said tools to turn on said pins in both directions.

6. A tiller comprising a shaft, a plurality of rings adjustable longitudinally of said shaft for selectively spacing the same, a plurality of planes of tools removably mounted on each ring, and mounting means permitting the selective use of either one plane or several planes of tools on each ring.

7. A tiller comprising an axle and tool-carrying means around the same, tools having resilient shanks curved and superposed on said means to engage and brace each other, and claws on said shanks which are curved reverse to the shanks and arranged to have their points cut the soil in a substantially vertical line and then have their inner parts and the shanks wedge the soil rearwardly.

8. A tiller comprising rotatable tools with claws thereon, a housing covering said tools and claws for preventing undesired spreading of earth particles, and a rear gate swingably mounted on said housing to move rearwardly.

9. A tiller comprising rotatable tool carrying means including tools with claws thereon, a housing mounted over said tools and claws for protecting same and to prevent undesired spreading of earth particles, means for supporting said housing with the lower end near the ground, and a gate with means movable over the ground, said gate being mounted to swing rearwardly on said housing and prevent clogging of the ground therein.

10. A tiller comprising rotatable tools with claws, a supporting frame and a housing for protecting said rotatable tools and to prevent undesired spreading of earth particles, said housing including gate mechanism mounted across its rear end to move readily rearwardly to prevent clogging of the ground therein, and fingers on said gate mechanism to drag over the ground and shape the surface in a corrugated manner to prevent crusting and cracking of the soil.

In testimony whereof I have sign d my name to this specification.

HANS von RAUSSENDORFF.